United States Patent [19]

Kioka et al.

[11] Patent Number: 5,122,491
[45] Date of Patent: Jun. 16, 1992

[54] CATALYST FOR POLYMERIZING AN OLEFIN AND PROCESS FOR POLYMERIZING AN OLEFIN

[75] Inventors: Mamoru Kioka; Norio Kashiwa, both of Iwakuni; Toshiyuki Tsutsui, Ohtake; Akinori Toyota, Iwakuni, all of Japan

[73] Assignee: Mitsui Petrochemical Industries, Ltd., Tokyo, Japan

[21] Appl. No.: 290,110

[22] PCT Filed: Apr. 19, 1988

[86] PCT No.: PCT/JP88/00384

§ 371 Date: Dec. 16, 1988

§ 102(e) Date: Dec. 16, 1988

[87] PCT Pub. No.: WO88/08432

PCT Pub. Date: Nov. 3, 1988

[30] Foreign Application Priority Data

Apr. 20, 1987 [JP] Japan ............... 62-95445
Apr. 20, 1987 [JP] Japan ............... 62-95446

[51] Int. Cl.⁵ .................. C08F 4/642; C08F 10/00
[52] U.S. Cl. ..................... 502/117; 502/103; 526/127; 526/128; 526/129; 526/153; 526/348.4; 526/352; 526/904
[58] Field of Search ........... 526/127, 153; 502/103, 502/117

[56] References Cited

U.S. PATENT DOCUMENTS

| | | | |
|---|---|---|---|
| 2,952,670 | 9/1960 | Fischer | 526/160 |
| 3,056,771 | 10/1962 | Aldridge et al. | 526/159 |
| 3,242,099 | 3/1966 | Manyik et al. | 526/153 |
| 4,472,519 | 9/1984 | McDaniel | |
| 4,680,353 | 7/1987 | Ishihara et al. | 526/165 |
| 4,704,491 | 11/1987 | Tsutsui et al. | 526/160 |
| 4,739,022 | 4/1988 | Blenkus et al. | 526/116 |
| 4,769,428 | 9/1988 | Zboril et al. | 526/165 |
| 4,794,096 | 12/1988 | Ewen | 526/153 |

FOREIGN PATENT DOCUMENTS

| | | |
|---|---|---|
| 131420 | 1/1985 | European Pat. Off. |
| 2539133 | 7/1984 | France |
| 45-20110 | 7/1970 | Japan ............... 526/127 |
| 2057468 | 4/1981 | United Kingdom |

*Primary Examiner*—Edward J. Smith
*Attorney, Agent, or Firm*—Sherman and Shalloway

[57] ABSTRACT

An olefin is polymerized or copolymerized under the presence of an olefin-polymerizing catalyst prepared from (A) a transition-metal compound or (A') a transition-metal compound loaded on a fine-particle carrier, said transition metal being selected from group IVB in the periodic table; (B) an aluminoxane; and (C) an organoaluminum compound represented by the general formula [I] or [II]:

$$R^1_m Al(OR^2)_{3-m} \quad [I]$$

$$R^3_n Al(OSiR^4_3)_{3-n} \quad [II]$$

wherein $R^1$, $R^2$, and $R^3$ are selected from hydrocarbon radicals, $R^4$ is selected from the group consisting of hydrocarbon, alkoxy, and aryloxy radicals, and m and n are positive numbers of $0 < m < 3$ and $0 < n < 3$. This catalyst has a significantly high polymerization activity, and the thus produced olefin polymer or copolymer has a narrow composition distribution, a high bulk density, and uniform grain size with little powdery product.

9 Claims, No Drawings

CATALYST FOR POLYMERIZING AN OLEFIN AND PROCESS FOR POLYMERIZING AN OLEFIN

TECHNICAL FIELD

The present invention relates to a catalyst for polymerizing of an olefin and a process for polymerizing an olefin by using such a catalyst. More specifically, the present invention relates to a catalyst and a process for polymerizing a high-molecular weight olefin at a high polymerization activity even when the amount of expensive aluminoxane included in the catalyst is reduced. Further, the present invention relates to a catalyst and a process for polymerizing an olefin to produce an olefin polymer having a narrow molecular-weight distribution, and an olefin copolymer having a narrow composition distribution as well as a narrow molecular-weight distribution at a high polymerization activity when applied to the copolymerization of two or more olefins. Still further, the present invention relates to a catalyst and a process for polymerizing an olefin to produce an olefin polymer having a narrow molecular-weight distribution, a high bulk density, and excellent powder properties.

BACKGROUND TECHNOLOGY

α-olefin polymers, particularly ethylene polymer and an ethylene-α-olefin copolymer have generally been prepared by a known process wherein ethylene is polymerized, or ethylene and an α-olefin are copolymerized under the presence of a titanium-based catalyst comprising a titanium compound and an organoaluminum compound or a vanadium-based catalyst comprising a vanadium compound and an organoaluminum compound.

A new series of Ziegler catalysts comprising a zirconium compound and an aluminoxane have also been recently proposed for polymerization of an olefin.

Japanese Patent Application Kokai No. 58-19309 describes a process for polymerizing ethylene and at least one $C_3-C_{12}$ α-olefin at a temperature of from $-50°$ to $200°$ C. under the presence of a catalyst comprising a transition metal-containing compound represented by the formula:

(cyclopentadienyl)$_2$MeRHal wherein R is selected from cyclopentadienyl, $C_1-C_6$ alkyl, and halogen, Me is a transition metal, and Hal is a halogen, a linear aluminoxane represented by the formula:

Al$_2$OR$_4$(Al(R)—O)$_n$ wherein R is methyl or ethyl, and n is a number of 4 to 20, and a cyclic aluminoxane represented by the formula:

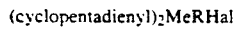

wherein R and n are as defined above. It is also described that ethylene should be polymerized in the presence of a small amount, that is, up to 10% by weight of an α-olefin having a somewhat longer chain or the mixture thereof to adjust a density of the resulting polyethylene.

Japanese Patent Application Kokai No. 59-95292 describes processes for preparing a linear aluminoxane represented by the formula:

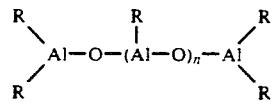

wherein n is a number of 2 to 40 and R is a $C_1-C_6$ alkyl, and a cyclic aluminoxane represented by the formula:

wherein n and R are as described above. It is also disclosed that at least 25 million grams of polyethylene may be produced per 1 g of transition metal per hour when an olefin is polymerized in the presence of a mixture of, for example, methylaluminoxane prepared as described above and a bis(cyclopentadienyl) compound containing titanium or zirconium.

Japanese Patent Application Kokai 60-35005 discloses a process for preparing an olefin-polymerization catalyst comprising effecting a reaction between a magnesium compound and an aluminoxane compound represented by the formula:

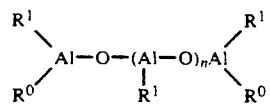

wherein $R^1$ is a $C_1-C_{10}$ alkyl radical, and $R^0$ may represent $R^1$ or, taken together, form —O—; chlorinating the reaction product; and treating the product with Ti, V, Zr, or Cr-containing compound to produce an olefin-polymerizing catalyst. It is also disclosed that this catalyst is particularly preferable for copolymerizing ethylene with a $C_3-C_{12}$ α-olefin.

Japanese Patent Application Kokai No. 60-35006 discloses a catalyst system for polymers blended in a reactor which comprises a combination of (a) a mono-, di- or tri-cyclopentadienyl compound of at least two different transition metals, or a derivative thereof, and (b) an aluminoxane. Example 1 of this application discloses that a polyethylene having a number average molecular weight of 15,300, a weight average molecular weight of 36,400, and propylene content of 3.4% may be prepared by polymerizing ethylene and propylene by using bis(pentamethylcyclopentadienyl)zirconium dimethyl and an aluminoxane as catalyst. Example 2 discloses that a blend of polyethylene and ethylene-propylene copolymer having a number average molecular weight of 2,000, a weight average molecular weight of 8,300, and propylene content of 7.1 mol % and comprising a toluene-soluble portion having a number average molecular weight of 2,200, a weight average molecular weight of 11,900, and propylene content of 30 mol % and a toluene-insoluble portion having a number average molecular weight of 3,000, a weight average molecular weight of 7,400, and propylene content of 4.8 mol % may be prepared by polymerizing ethylene and propylene by using bis(pentamethylcyclopentadienyl)zirconium dichloride, bis(methylcyclopentadienyl)zirconium dichloride, and an aluminoxane as catalyst. Example 3 discloses a blend of LLDPE and ethylene-propylene copolymer comprising a soluble portion having a molecular weight distribution ($\overline{M}w/\overline{M}n$) of 4.57 and propylene content of 20.6 mol %, and an insoluble portion having a molecular weight distribution of 3.04 and propylene content of 2.9 mol %.

Japanese Patent Application Kokai No. 60-35007 describes a process for polymerizing ethylene either alone or together with an α-olefin having at least 3 carbon atoms under the presence of a catalyst containing a metallocene and a cyclic aluminoxane represented by the formula:

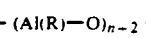

wherein R is an alkyl radical of 1 to 5 carbon atoms and n is as described above. The polymer prepared by such a process has a weight average molecular weight of about 500 to about 1,400,000 and a molecular-weight distribution of 1.5 to 4.0.

Japanese Patent Application Kokai No. 60-35008 discloses that a polyethylene or an ethylene-$C_{3-10}$ α-olefin copolymer having a wide molecular-weight distribution may be prepared by using a catalyst system containing at least two metallocenes and an aluminoxane. There is also disclosed that the copolymer has a molecular-weight distribution ($\overline{M}w/\overline{M}n$) of 2 to 50.

Japanese Patent Application Kokai Nos. 60-260602 and 60-130604 disclose processes for polymerizing an olefin by utilizing catalysts comprising a transition metal compound and mixed organoaluminum compounds of an aluminoxane and organoaluminum compound. These patent applications disclose that polymerization activity per unit weight of the transition metal can be increased by adding the organoaluminum compound. However, these processes suffered from a defect that the catalysts required a large amount of expensive aluminoxane, and the activity per unit weight of the aluminoxane was still low.

The catalysts comprising a transition metal compound and an aluminoxane as proposed in the above-mentioned patent applications are provided with a significantly superior polymerization activity compared to the conventional catalyst systems prepared from a transition metal compound and an organoaluminum compound. These catalysts, however, are mostly soluble in the reaction system, and frequently require adoption of solution polymerization system, resulting in a significantly increased viscosity of the polymerization-system solution. Moreover, the polymers produced by subsequently treating with these solution systems have low bulk density, and therefore, polymers having excellent powder properties have been quite difficult to obtain.

On the other hand, attempts have been made to polymerize an olefin in dispersion or gas-phase polymerization systems by using catalysts wherein one or both of said transition metal compound and said aluminoxane are supported on a porous carrier of an inorganic oxide such as silica, silica-alumina, and alumina.

For example, aforementioned Japanese Patent Application Kokai Nos. 60-35006, 60-35007 and 60-35008 disclose that the transition metal compound and the aluminoxane supported on a carrier such as silica, silica-alumina, and alumina can also be used as catalysts.

Japanese Patent Application Kokai Nos. 60-106808 and 61-106809 disclose a process for preparing a composition comprising a polyethylene-based polymer and a filler which involves preliminarily contacting a high-activity catalyst component containing titanium and/or zirconium which is soluble in a hydrocarbon solvent with a filler, and then polymerizing ethylene or copolymerizing ethylene and an α-olefin in the presence of the thus treated catalyst component, an organoaluminum compound, and a filler which has an affinity for a polyolefin.

Japanese Patent Application Kokai No. 61-31404 discloses a process for polymerizing ethylene or copolymerizing ethylene and an α-olefin in the presence of a mixed catalyst comprising a transition metal compound and a product obtained by reacting a trialkylaluminum and water under the presence of silicon dioxide or aluminum oxide.

Japanese Patent Application Kokai No. 61-276805 discloses a process for polymerizing an olefin in the presence of a catalyst comprising a reaction mixture between an inorganic oxide containing surface hydroxyl radical such as silica and a reaction mixture obtained by reacting a zirconium compound and an aluminoxane with a trialkylaluminum.

Japanese Patent Application Kokai Nos. 60-108610 and 61-296008 disclose a process for polymerizing an olefin in the presence of a catalyst comprising a transition metal compound such as a metallocene and an aluminoxane supported on a carrier such as an inorganic oxide.

However, when an olefin is polymerized or copolymerized in a dispersion or gas-phase polymerization system by utilizing the solid catalyst components supported on a carrier as mentioned above, polymerization activity is markedly reduced and the properties inherent to the catalyst comprising the transition metal compound catalyst component and the aluminoxane catalyst component are not fully exerted. Powder properties such as bulk density of the thus prepared polymer were also insufficient.

SUMMARY OF THE INVENTION

An object of the present invention is to provide a catalyst which can polymerize an olefin at a high polymerization activity per aluminoxane contained in the catalyst and produce a high-molecular weight olefin polymer having a narrow molecular-weight distribution or a high-molecular weight olefin copolymer, particularly an ethylene-α-olefin copolymer, having both narrow molecular-weight distribution and composition distribution when used in the copolymerization of two or more olefins. Another object of the present invention is to provide a method for polymerizing an olefin by using such a catalyst.

Further object of the present invention is to provide a catalyst which can polymerize an olefin at a high polymerization activity and produce an olefin polymer having a high bulk density and excellent powder properties. A still further object of the present invention is to provide a method for polymerizing an olefin polymer by using such a catalyst.

According to the present invention, there are provided a catalyst prepared from (A) a transition-metal compound, said transition metal being selected from group IVB in the periodic table, (B) an aluminoxane, and (C) an organoaluminum compound represented by the general formula [I] or [II]:

$$R^1_m Al(OR^2)_{3-m} \quad [I]$$

$$R^3_n Al(OSiR^4_3)_{3-n} \quad [II]$$

wherein $R^1$, $R^2$, and $R^3$ are selected from hydrocarbon radicals, $R^4$ is selected from the group consisting of hydrocarbon, alkoxy, and aryloxy radicals, and m and n are each a positive number of $0 < m < 3$ and $0 < n < 3$; and a process for polymerizing an olefin wherein the olefin is polymerized or copolymerized in the presence of said catalyst.

According to the present invention, there are also provided a catalyst prepared from (A') a transition-metal compound supported on a fine-particle carrier, said transition metal being selected from group IVB in the periodic table, (B) an aluminoxane, and (C) an organoaluminum compound represented by the general formula [I] or [II]:

$$R^1_m Al(OR^2)_{3-m} \quad [I]$$

$$R^3_n Al(OSiR^4_3)_{3-n} \quad [II]$$

wherein $R^1$, $R^2$, and $R^3$ are selected from hydrocarbon radicals, $R^4$ is selected from the group consisting of hydrocarbon, alkoxy, and aryloxy radicals, and m and n are each a positive number of $0 < m < 3$ and $0 < n < 3$; and a process for polymerizing an olefin wherein the olefin is polymerized or copolymerized in the presence of said catalyst.

DETAILED DESCRIPTION OF THE INVENTION

The term polymerization used herein may include not only homopolymerization but also copolymerization. Similarly, the term polymer may include both homopolymer and copolymer.

A catalyst employed in a first embodiment of the present invention is prepared from three catalyst components (A), (B) and (C).

A group IVB transition metal contained in the catalyst component (A) is selected from the group consisting of titanium, zirconium and hafnium. The transition metal contained in the catalyst component (A) may preferably be titanium or zirconium, and most preferably is zirconium.

The group IVB transition-metal compound of the catalyst component (A) may typically be a zirconium compound having a radical containing conjugated π electron as a ligand.

The zirconium compound having a radical containing conjugated π electron as a ligand is, for example, a compound represented by the formula [III]:

$$R^1_k R^2_l R^3_m R^4_n Zr \quad [III]$$

wherein $R^1$ is an unsubstituted or substituted cycloalkadienyl radical; $R_2$, $R_3$ and $R_4$ are selected from the group consisting of cycloalkadienyl, aryl, alkyl, cycloalkyl and aralkyl radicals, halogen atom, hydrogen, $OR^a$, $SR^b$, $NR^c_2$ and $PR^d_2$, wherein $R^a$, $R^b$, $R^c$ and $R^d$ are hydrocarbon radicals selected from the group consisting of alkyl, cycloalkyl, aryl and aralkyl radicals or silyl radicals, with the proviso that $R^c$ and $R^d$ may, taken together, form a ring; $k \geq 1$; and $k + l + m + n = 4$. When $R^2$ is an cycloalkadienyl radical, $R^1$ and $R^2$ may be bonded by an intervening lower alkylene radical. Examples of the cycloalkadienyl radical include cyclopentadienyl, methylcyclopentadienyl, ethylcyclopentadienyl, pentamethylcyclopentadienyl, dimethylcyclopentadienyl, indenyl, tetrahydroindenyl, etc. Examples of the alkyl radicals include methyl, ethyl, propyl, isopropyl, butyl, hexyl, octyl, 2-ethylhexyl, decyl, oleyl, etc. Examples of the aryl radicals include phenyl, tolyl, etc. Examples of the aralkyl radicals include benzyl, neophyl, etc. Examples of the cycloalkyl radicals include cyclopentyl, cyclohexyl, cyclooctyl, norbonyl, bicyclononyl, and an alkyl-substituted radical thereof. Examples of the silyl radicals include trimethylsilyl, triethylsilyl, phenyldimethylsilyl, triphenylsilyl, etc. Unsaturated aliphatic radicals such as vinyl, allyl, propenyl, isopropenyl, and 1-butenyl, and unsaturated cycloaliphatic radicals such as cyclohexenyl may also be employed. Examples of the halogen atoms include fluorine, chlorine, bromine, etc. Examples of the lower alkylene radicals include methylene, ethylene, propylene, butylene, etc.

Examples of the zirconium compounds include:
bis(cyclopentadienyl)zirconium monochloride monohydride;
bis(cyclopentadienyl)zirconium monobromide monohydride;
bis(cyclopentadienyl)methylzirconium hydride;
bis(cyclopentadienyl)ethylzirconium hydride;
bis(cyclopentadienyl)cyclohexylzirconium hydride;
bis(cyclopentadienyl)phenylzirconium hydride;
bis(cyclopentadienyl)benzylzirconium hydride;
bis(cyclopentadienyl)neopentylzirconium hydride;
bis(methylcyclopentadienyl)zirconium monochloride monohydride;
bis(indenyl)zirconium monochloride monohydride;
bis(cyclopentadienyl)zirconium dichloride;
bis(cyclopentadienyl)zirconium dibromide;
bis(cyclopentadienyl)methylzirconium monochloride;
bis(cyclopentadienyl)ethylzirconium monochloride;
bis(cyclopentadienyl)cyclohexylzirconium monochloride;
bis(cyclopentadienyl)phenylzirconium monochloride;
bis(cyclopentadienyl)benzylzirconium monochloride;
bis(methylcyclopentadienyl)zirconium dichloride;
bis(tetramethylcyclopentadienyl)zirconium dichloride;
bis(indenyl)zirconium dichloride;
bis(indenyl)zirconium dibromide;
bis(cyclopentadienyl)zirconium diphenyl;
bis(cyclopentadienyl)zirconium dibenzyl;
bis(cyclopentadienyl)methoxyzirconium chloride;
bis(cyclopentadienyl)ethoxyzirconium chloride;
bis(cyclopentadienyl)butoxyzirconium chloride;
bis(cyclopentadienyl)-2-ethylhexoxyzirconium chloride;
bis(cyclopentadienyl)methylzirconium ethoxide;
bis(cyclopentadienyl)methylzirconium butoxide;
bis(cyclopentadienyl)ethylzirconium ethoxide;
bis(cyclopentadienyl)phenylzirconium ethoxide;
bis(cyclopentadienyl)benzylzirconium ethoxide;
bis(methylcyclopentadienyl)ethoxyzirconium chloride;
bis(indenylethoxy)zirconium chloride;
bis(cyclopentadienyl)ethoxyzirconium chloride;
bis(cyclopentadienyl)butoxyzirconium chloride;

bis(cyclopentadienyl)-2-ethylhexoxyzirconium chloride;
bis(cyclopentadienyl)phenoxyzirconium chloride;
bis(cyclopentadienyl)cyclohexoxyzirconium chloride;
bis(cyclopentadienyl)phenylmethoxyzirconium chloride;
bis(cyclopentadienyl)methylzirconium phenylmethoxide;
bis(cyclopentadienyl)trimethylsiloxyzirconium chloride;
bis(cyclopentadienyl)triphenylsiloxyzirconium chloride;
bis(cyclopentadienyl)thiophenylzirconium chloride;
bis(cyclopentadienyl)thioethylzirconium chloride;
bis(cyclopentadienyl)bis(dimethylamide)zirconium;
bis(cyclopentadienyl)diethylamidezirconium chloride;
ethylenebis(indenyl)ethoxyzirconium chloride;
ethylenebis(4,5,6,7-tetrahydro-1-indenyl)ethoxy-zirconium chloride;
ethylenebis(indenyl)dimethylzirconium;
ethylenebis(indenyl)diethylzirconium;
ethylenebis(indenyl)diphenylzirconium;
ethylenebis(indenyl)dibenzylzirconium;
ethylenebis(indenyl)methylzirconium monobromide;
ethylenebis(indenyl)ethylzirconium monochloride;
ethylenebis(indenyl)benzylzirconium monochloride;
ethylenebis(indenyl)methylzirconium monochloride;
ethylenebis(indenyl)zirconium dichloride;
ethylenebis(indenyl)zirconium dibromide;
ethylenebis(4,5,6,7-tetrahydro-1-indenyl)dimethylzirconium;
ethylenebis(4,5,6,7-tetrahydro-1-indenyl)methylzirconium monochloride;
ethylenebis(4,5,6,7-tetrahydro-1-indenyl)zirconium dichloride;
ethylenebis(4,5,6,7-tetrahydro-1-indenyl)zirconium dibromide;
ethylenebis(4-methyl-1-indenyl)zirconium dichloride;
ethylenebis(5-methyl-1-indenyl)zirconium dichloride;
ethylenebis(6-methyl-1-indenyl)zirconium dichloride;
ethylenebis(7-methyl-1-indenyl)zirconium dichloride;
ethylenebis(5-methoxy-1-indenyl)zirconium dichloride;
ethylenebis(2,3-dimethyl-1-indenyl)zirconium dichloride;
ethylenebis(4,7-dimethyl-1-indenyl)zirconium dichloride;
ethylenebis(4,7-dimethoxy-1-indenyl)zirconium dichloride;
ethylenebis(indenyl)zirconium dimethoxide;
ethylenebis(indenyl)zirconium diethoxide;
ethylenebis(indenyl)methoxyzirconium chloride;
ethylenebis(indenyl)ethoxyzirconium chloride;
ethylenebis(indenyl)methylzirconium ethoxide;
ethylenebis(4,5,6,7-tetrahydro-1-indenyl)zirconium dimethoxide;
ethylenebis(4,5,6,7-tetrahydro-1-indenyl)zirconium ethoxide;
ethylenebis(4,5,6,7-tetrahydro-1-indenyl)methoxyzirconium chloride;
ethylenebis(4,5,6,7-tetrahydro-1-indenyl)ethoxyzirconium chloride; and
ethylenebis(4,5,6,7-tetrahydro-1-indenyl)methylzirconium ethoxide.

Examples of the titanium compound include:
bis(cyclopentadienyl)titanium monochloride monohydride;
bis(cyclopentadienyl)methyltitanium hydride;
bis(cyclopentadienyl)phenyltitanium chloride;
bis(cyclopentadienyl)benzyltitanium chloride;
bis(cyclopentadienyl)titanium dichloride;
bis(cyclopentadienyl)titanium dibenzyl;
bis(cyclopentadienyl)ethoxytitanium chloride;
bis(cyclopentadienyl)butoxytitanium chloride;
bis(cyclopentadienyl)methyltitanium ethoxide;
bis(cyclopentadienyl)phenoxytitanium chloride;
bis(cyclopentadienyl)trimethylsiloxytitanium chloride;
bis(cyclopentadienyl)thiophenyltitanium chloride;
bis(cyclopentadienyl)bis(dimethylamide)titanium;
bis(cyclopentadienyl)diethoxytitanium;
ethylenebis(indenyl)titanium dichloride; and
ethylenebis(4,5,6,7-tetrahydro-1-indenyl)titanium dichloride.

Examples of the hafnium compound include:
bis(cyclopentadienyl)hafnium monochloride monohydride;
bis(cyclopentadienyl)ethylhafnium hydride;
bis(cyclopentadienyl)phenylhafnium chloride;
bis(cyclopentadienyl)hafnium dichloride;
bis(cyclopentadienyl)hafnium dibenzyl;
bis(cyclopentadienyl)ethoxyhafnium chloride;
bis(cyclopentadienyl)butoxyhafnium chloride;
bis(cyclopentadienyl)methylhafnium ethoxide;
bis(cyclopentadienyl)phenoxyhafnium chloride;
bis(cyclopentadienyl)thiophenylhafnium chloride;
bis(cyclopentadienyl)bis(diethylamide)hafnium;
ethylenebis(indenyl)hafnium dichloride; and
ethylenebis(4,5,6,7-tetrahydro-1-indenyl)hafnium dichloride.

The catalyst component (B) is an aluminoxane.
The aluminoxane which can be used herein may be represented by the formulae [VII] and [VIII]:

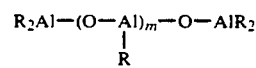

[VII]

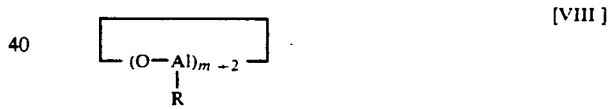

[VIII]

wherein R is a hydrocarbon radical selected from the group consisting of methyl, ethyl, n-propyl, isopropyl, n-butyl, and isobutyl, preferably methyl, ethyl, or isobutyl, and most preferably methyl; and m is an integer of at least 2, and preferably at least 5.

The aluminoxane of formulae [VII] and [VIII] may be a halogenated aluminoxane wherein R may partly be substituted with a halogen atom such as chlorine and bromine with the proviso that the halogen content is up to 40% by weight. R may also partly be hydroxyl, alkoxy and/or aryloxy radical.

Typical processes for preparing said aluminoxane include: (1) a process comprising preparing a hydrocarbon medium suspension of a compound containing adsorbed water or a salt containing water of crystallization such as hydrated magnesium chloride, hydrated copper sulfate, hydrated aluminum sulfate, hydrated nickel sulfate, and hydrated cerous chloride; and adding a trialkylaluminum into said suspension for reaction; and (2) a process wherein water is directly reacted with a trialkylaluminum in a medium such as benzene, toluene, ethylether, and tetrahydrofuran.

Among these processes, process (1) is more preferable. A small amount of organometallic component may also be contained in the aluminoxane. For example, an organometallic compound such as a halogen-containing organoaluminum compound and organomagnesium compound may also be present with the trialkylaluminum.

The component (C) of the catalyst according to the present invention is an organoaluminum compound represented by the general formulae [I] and [II]:

$$R^1_m Al(OR^2)_{3-m} \qquad [I]$$

$$R^3_n Al(OSiR^4_3)_{3-n} \qquad [II]$$

wherein $R^1$, $R^2$, and $R^3$ are selected from hydrocarbons, $R^4$ is selected from the group consisting of hydrocarbon, alkoxy, and aryloxy radicals, and m and n are $0<m<3$ and $0<n<3$. In the organoaluminum compound represented by the general formulae [I] and [II], $R^1$, $R^2$, and $R^3$ may typically be a linear or branched, saturated or unsaturated, aliphatic hydrocarbon radical having 1 to 10 carbon atoms such as methyl, ethyl, n-propyl, isopropyl, n-butyl, t-butyl, sec-butyl, isobutyl, n-hexyl, n-octyl, and 2-ethylhexyl; an alicyclic hydrocarbon radical having 4 to 10 carbon atoms such as cyclohexane, methylcyclopentyl, and methylcyclohexyl; or an aromatic hydrocarbon radical having 6 to 16 carbon atoms such as phenyl, tolyl, xylyl, and naphtyl. In the organoaluminum compound represented by the general formulae [I] and [II], $R^1$ and $R^3$ may preferably be a branched hydrocarbon radical, and most preferably is a branched alkyl radical. $R^2$ may most preferably be a methyl radical. In the organoaluminum compound represented by the general formula [II], $R^4$ may typically be an aliphatic hydrocarbon radical having 1 to 10 carbon atoms such as methyl, ethyl, propyl, isopropyl, n-butyl, and isobutyl; an alicyclic hydrocarbon radical having 4 to 10 carbon atoms such as cyclohexyl, methylcyclopentyl, and methylcyclohexyl; an aromatic hydrocarbon radical having 6 to 16 carbon atoms such as phenyl, tolyl, xylyl, and naphtyl; an alkoxy radical having 4 to 10 carbon atoms such as methoxy, ethoxy, propoxy, butoxy, iso-butoxy, cyclohexyloxy, methylcyclopentyloxy, and methylcyclohexyloxy; and an aryloxy radical such as phenoxy, tolyloxy, and naphthoxy. In the formula [I], m may be a positive number of $0<m<3$, preferably a positive number of $1 \leq m \leq 2.5$, and most preferably $m=2$. In the formula [II], n may be a positive number of $0<n<3$, preferably be a positive number of $1 \leq n \leq 2.5$, and most preferably be $n=2$.

Typical organoaluminum compounds (C) represented by the general formula [I] include dialkylaluminum alkoxides such as diethylaluminum methoxide, diisopropylaluminum methoxide, diisobutylaluminum methoxide, diisobutylaluminum methoxide, bis(2-methylbutyl)aluminum methoxide, bis(3-methylbutyl)aluminum methoxide, bis(2-methylpentyl)aluminum methoxide, bis(3-methylpentyl)aluminum ethoxide, bis(4-methylpentyl)aluminum propoxide, bis(2-methylhexyl)aluminum butoxide, and bis(3-methylhexyl)aluminum cyclohexyloxide; dicycloalkylaluminum alkoxides such as bis(2-ethylhexyl)aluminum phenoxide, and dicyclohexylaluminum methoxide; bisarylaluminum alkoxides such as diphenylaluminum methoxide and bistolylaluminum methoxide; alkylaluminum dialkoxides such as ethylaluminum dimethoxide, isopropylaluminum dimethoxide, isobutylaluminum diethoxide, 2-methylbutylaluminum dimethoxide, 3-methylbutylaluminum dimethoxide, 3-methylbutylaluminum dimethoxide, 2-methylpentylaluminum dimethoxide, 3-methylpentylaluminum dimethoxide, 4-methylpentylaluminum dimethoxide, 2-methylhexylaluminum dipropoxide, 3-methylhexylaluminum dicyclohexyloxide, and 2-ethylhexylaluminum diphenoxide; cycloalkylaluminum dialkoxides such as cyclohexylaluminum dimethoxide and cyclooctylaluminum diethoxide; arylaluminum alkoxides such as phenylaluminum methoxide and tolylaluminum ethoxide; and alkylaluminum sesquialkoxides wherein the number m equals 1.5 in the above-mentioned organoaluminum compounds. Among these organoaluminum compounds, dialkylaluminum alkoxides are preferred, and diisoalkylaluminum alkoxides are most preferred.

Typical organoaluminum compounds (C) represented by the general formula [II] include:
Et$_2$Al—O—Si—(OMe)$_3$,
isoPr$_2$Al—O—Si—(OEt)$_3$,
isoBu$_2$Al—O—Si—(OMe)$_3$,
isoBu$_2$Al—O—Si—(OEt)$_3$,
isoBu$_2$Al—O—Si—(O n—Bu)$_3$,
isoBu$_2$Al—O—Si—(O n—Hexyl)$_3$,
isoOctyl$_2$Al—O—Si—(OEt)$_3$,
isoBu$_2$Al—O—SiMe$_3$,
isoBu$_2$Al—O—SiEt$_3$,
isoBu$_2$Al—O—SiPh$_3$ etc.

The organoaluminum compound (C) may be added to the reaction system as raw compounds which will react to produce the organoaluminum compound (C) in the reaction system.

In the process according to the present invention, the catalyst is generally prepared from the transition-metal compound (A), the aluminoxane (B), and the organoaluminum compound (C), although any additional components such as an electron donor may optionally be added to the reaction system. The electron donor component may be supplied to the polymerization reaction system either directly with the transition-metal compound (A), the aluminoxane (B), and the organoaluminum compound (C), or as a complex or a reaction product with any of the components (A), (B) and (C). Exemplary electron donors include carboxylic acids, esters, ethers, ketones, aldehydes, alcohols, phenols, acid amides, oxygen-containing compounds such as those containing a metal—O—C bond, the metal being aluminum, silicon, etc., nitriles, amines, phosphines, etc. The proportion of the electron donor may generally be from 0 to 1 mole per 1 gram atom of the transition metal element (M).

In the process according to the present invention, catalyst components (A), (B), and (C) may either be introduced into the reaction system separately, or two of the components may preliminarily be contacted before introducing into the reaction system separately from the remaining one component. Further, all three components may preliminarily be contacted and then introduced into the reaction system.

When catalyst components (A) and (B) are subjected to the preliminary contact process, the concentration of the transition metal is generally in the range of $2.5 \times 10^{-4}$ to $1.5 \times 10^{-1}$ gram atoms/liter, and preferably $5.0 \times 10^{-4}$ to $1.0 \times 10^{-1}$ gram atoms/liter, and the concentration of the aluminoxane is generally in the range of from 0.05 to 5 gram atoms/liter and preferably from 0.1 to 3 gram atoms/liter calculated as aluminum atom. The temperature of the preliminary contact treatment is generally $-50°$ to $100°$ C., and the mixing time is generally 0.1 to 50 minutes.

A catalyst employed in a second embodiment of the present invention is prepared from a solid catalyst component (A'), and catalyst components (B) and (C).

The solid catalyst component (A') used in the method of the present invention is a solid component wherein at least a group IVB transition metal compound is loaded on a fine-particle carrier. Most preferably, the solid catalyst component is a fine-particle carrier loaded with the group IVB transition metal compound as well as the aluminoxane component (B) to allow production of an excellent olefin polymer having a high bulk density and good powder properties at an improved polymerization activity.

The carrier constituting the solid catalyst component (A') is a fine-particle carrier which may be either inorganic or organic.

Examples of the inorganic fine-particle carriers include $SiO_2$, $Al_2O_3$, MgO, $ZrO_2$, $TiO_2$, $B_2O_3$, CaO, ZnO, $ThO_2$, etc. and mixtures thereof such as $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO, etc. These inorganic fine-particle carriers are generally calcined at 150° to 1000° C., and preferably at 200° to 800° C. Among these carriers, a carrier primarily comprising at least one component selected from the group consisting of $SiO_2$ and $Al_2O_3$ is preferred. The inorganic fine-particle carrier may also contain a minor amount of carbonate such as $Na_2CO_3$, $K_2CO_3$, $CaCO_3$, and $MgCO_3$, sulfates such as $Na_2SO_4$, $Al_2(SO_4)_3$, and $BaSO_4$, nitrates such as $KNO_3$, $Mg(NO_3)_2$, and $Al(NO_3)_3$, oxides such as $Na_2O$, $K_2O$, and $Li_2O$, and the like. Although the inorganic carrier may have different diameters depending on the type and process of manufacture, the diameter of the carrier which is preferably utilized in the present invention is generally 5 to 200 μm, and preferably 10 to 150 μm, and more preferably 20 to 100 μm.

Examples of the organic fine-particle carriers include polyolefins such as polyethylene, polypropylene, poly(1-butene), poly(4-methyl-1-pentene) and those prepared by copolymerizing the monomers employed for producing such polyolefins; polyesters such as polymethyl methacrylate, and polymethyl acrylate; polyamides; polyvinyl chlorides; polystyrene; natural high polymers; and monomer compounds. Although the properties of the carrier may vary depending on the type and the process of manufacture, the carrier which is preferably used in the present invention may have a diameter of 5 to 200 μm, preferably 10 to 150 μm, and more preferably 20 to 100 μm.

The carrier may have any molecular weight so long as the carrier can remain a solid material. For example, a polyester carrier which may be employed herein has a weight average molecular weight of from about 1,000 to about 10,000,000.

The fine-particle carrier may be subjected to a preliminary contact treatment with compounds such as an organoaluminum compound, aluminoxane compound or halogen-containing silane compound prior to the loading of the group IVB transition metal compound onto the carrier.

The organoaluminum compounds which may be used in the preliminary contact treatment include trialkylaluminums such as trimethylaluminum, triethylaluminum, tri-n-butylaluminum, triisobutylaluminum, etc.; alkenylaluminums such as isoprenylaluminum; dialkylaluminum alkoxides such as dimethylaluminum methoxide, diethylaluminum ethoxide, dibutylaluminum butoxide, diisobutylaluminum methoxide, etc.; alkylaluminum sesquialkoxides such as methylaluminum sesquimethoxide, ethylaluminum sesquiethoxide, etc.; partially alkoxylated alkylaluminums having average composition represented by the formula: $R'_{2.5}Al(OR'')_{0.5}$; partially halogenated alkylaluminums, for example, dialkylaluminum halides such as dimethylaluminum chloride, diethylaluminum chloride, dimethylaluminum bromide, etc.; alkylaluminum sesquihalides such as methylaluminum sesquichloride, ethylaluminum sesquichloride, etc.; and alkylaluminum dihalides such as methylaluminum dichloride, ethylaluminum dichloride, etc. The organoaluminum compound may preferably be trialkylaluminum, dialkylaluminum chloride, and dialkylaluminum alkoxide, and most preferably be trimethylaluminum, triethylaluminum, triisobutylaluminum, dimethylaluminum chloride, diethylaluminum chloride, and diisobutylaluminum methoxide. The aluminoxane compound which may be used in the preliminary contact treatment of the fine-particle carrier is the one represented by the general formulae [IV] and [V]:

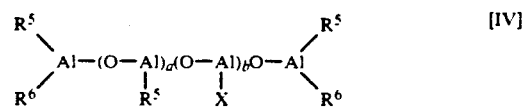

wherein $R^5$ is a hydrocarbon radical such as methyl, ethyl, propyl, butyl, and preferably methyl or ethyl, and most preferably methyl; and X is a halogen atom such as chlorine and bromine; $R^6$ is either the hydrocarbon radical of $R^5$ or a halogen atom as defined above; a is a number of 0 to 80, and preferably from 0 to 30; b is a number of 0 to 80, and preferably from 0 to 30; and the sum of a and b is from 4 to 100, preferably from 8 to 50. In general formulae: [IV] and [V], units

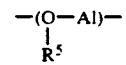

and

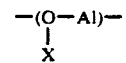

may either be block-polymerized, or regularly or irregularly random-polymerized.

The halogen-containing silane compound which may be used in the preliminary contact treatment of the fine-particle carrier is an organoaluminum compound represented by the general formula [VI]:

wherein X is Cl or Br, $R^7$ and $R^8$ are hydrogen atom or $C_{1-12}$ alkyl, aryl, or $C_{3-12}$ cycloalkyl, c is a number of 1 to 4, d is a number of 1 to 3, and the sum of c and d is 1 to 4.

Examples of the halogen-containing silane compound include tetrachlorosilane, tetrabromosilane, trichlorosilane, trichloromethylsilane, trichloroethylsilane, trichloropropylsilane, trichlorophenylsilane, trichlorocyclohexylsilane, tribromosilane, tribromoethylsilane, dichlorodimethylsilane, dichloromethylsilane, dichlorophenylsilane, trichloromethoxysilane, trichloroethoxysilane, trichloropropoxysilane, trichlorophenoxysilane, tribromoethoxysilane, dichloromethoxysilane, dichlorodimethoxysilane, trichlorosilanol, etc. A mixture of any of these silane compounds may also be utilized. Preferred silane compounds are tetrachlorosilane, trichlorosilane, and trichloromethylsilane.

Other compounds which may be utilized in the preliminary contact treatment of the fine-particle carrier include organoboron, organomagnesium, organotin, organolithium etc.

In the preliminary contact treatment of the fine-particle carrier with the organometallic compound or the silane compound, amount of the organometallic compound or the silane compound employed may range from 0.01 to 50, preferably from 0.05 to 30, and most preferably from 0.1 to 20 milligram atoms calculated as metal atom per gram of the fine-particle carrier. The treatment is carried out by adding at least one organometallic compound or silane compound to the fine-particle carrier dispersed in an inert medium, and the dispersion is heated to a temperature in the range of from 0° to 120° C., preferably from 10° to 100° C., and more preferably from 20° to 90° C. for a time period of from 10 minutes to 10 hours, preferably from 20 minutes to 5 hours, and more preferably from 30 minutes to 3 hours at ambient, reduced or elevated pressure.

The group IVB transition metal included in the solid catalyst component [A'] is a metal selected from the group consisting of titanium, zirconium and hafnium. The transition metal included in the solid catalyst component [A'] may preferably be titanium or zirconium, and more preferably zirconium in the second embodiment of the present invention.

Examples of the group IVB transition metal compound contained in the solid catalyst component [A'] include zirconium, titanium and hafnium compounds having a ligand including conjugated $\pi$ electron as described for the catalyst component [A] in the first embodiment of the present invention.

The group IVB transition metal compounds may be loaded on said fine-particle carrier by allowing functional radicals on the surface of the fine-particle carrier to react with said transition metal compound; contacting said fine-particle carrier with said transition metal compound after an optional preliminary contact treatment of the carrier with the aforementioned organoaluminum compound, aluminoxane compound or halogen-containing silane compound; contacting the fine-particle carrier with the transition metal compound in an inert hydrocarbon medium, and evaporating the hydrocarbon medium to precipitate the transition metal compound onto the carrier; contacting the fine-particle carrier with the aluminoxane in an inert hydrocarbon medium, preparing an aluminoxane-loaded fine-particle carrier by evaporating said medium or by adding a solvent to which the aluminoxane is either insoluble or hardly soluble to precipitate the aluminoxane onto the carrier, and contacting the transition metal compound with the aluminoxane-loaded fine-particle carrier to precipitate the transition metal compound onto the carrier; contacting the fine-particle carrier with the transition metal compound in an inert hydrocarbon medium, and evaporating the hydrocarbon medium to precipitate the transition metal compound onto the carrier; and contacting the fine-particle carrier with the transition metal compound in an inert hydrocarbon medium, and precipitating the transition metal compound onto the fine-particle carrier by adding a solvent to which the aluminoxane is either insoluble or hardly soluble.

The catalyst component (B) is the same as the catalyst component (B) as set forth in the first embodiment of the present invention.

In the practice of the present invention, the aluminoxane (B) may be supplied to the polymerization reaction system by methods as set forth below.

(1) The solid catalyst component (A') is not loaded with the aluminoxane. The solid catalyst component (A') and the aluminoxane (B) are independently supplied to the polymerization reaction system.

(2) The solid catalyst component (A') is the fine-particle carrier loaded with the group IVB transition metal compound and the aluminoxane (B). The solid catalyst component is supplied to the polymerization reaction system.

(3) The solid catalyst component (A') is that of (2). The solid catalyst component (A') is supplied to the polymerization reaction system together with the aluminoxane (B).

The solid catalyst component (A') comprising the fine-particle carrier loaded with the group IVB transition metal compound and the aluminoxane (B) may be prepared by the following processes (a) through (d) disclosed in Japanese Patent Application Nos. 61-311286 and 61-311287. (a) An olefin-polymerizing solid catalyst may be prepared by contacting a suspension of the fine-particle carrier dispersed in the aluminoxane solution with a solvent to which the aluminoxane is either insoluble or hardly soluble to produce an aluminoxane-loaded fine-particle carrier, and contacting said aluminoxane-loaded fine-particle carrier with the transition metal compound to produce a solid component.

Specifically, the olefin-polymerizing solid catalyst may be prepared by adding the solvent to which the aluminoxane is either insoluble or hardly soluble to the suspension comprising the aluminoxane solution and the fine-particle carrier to precipitate the aluminoxane onto the fine-particle carrier and form the aluminoxane-loaded fine-particle carrier; and contacting the suspension comprising the aluminoxane-loaded carrier and the solvent to which the aluminoxane is either insoluble or hardly soluble with the solution of the group IVB transition metal compound to load the catalyst-component transition metal compound onto the aluminoxane-loaded carrier. The aluminoxane may also be precipitated by adding said suspension comprising the aluminoxane solution and the carrier to the solvent to which the aluminoxane is either insoluble or hardly soluble. The aluminoxane precipitation may also be promoted by evaporating off the solvent used to dissolve the aluminoxane from said mixed suspension.

In the step of contacting the suspension comprising the aluminoxane solution and the fine-particle carrier with the solvent to which the aluminoxane is either insoluble or hardly soluble, the proportion of the solvent to which the aluminoxane is either insoluble or hardly soluble may generally be in the range of from 10 to 10,000 parts by weight, and preferably from 100 to 1,000 parts by weight based on 100 parts by weight of the aluminoxane solution. The contact treatment is generally carried out with agitation at a temperature of from −100° C. to 300° C., preferably from −50° C. to 100° C., and more preferably from −30° C. to 50° C.

The aluminoxane solution is prepared at least from the aluminoxane and the solvent capable of dissolving the aluminoxane as will be exemplified later. The aluminoxane solution may be obtained by simply mixing both compounds, or by mixing both compounds under heating. The solvent included in the aluminoxane solution may generally be from 0.1 to 50 liters, preferably from 0.2 to 10 liters, and more preferably from 0.3 to 2 liters per 1 gram atom of aluminum in the aluminoxane.

The amount of the fine-particle carrier employed in the suspension of the fine-particle carrier into the aluminoxane solution may generally be in the range of from 1 to 500 g, preferably from 10 to 200 g, and more preferably from 20 to 100 g per liter of the aluminoxane solution.

In the step of contacting the suspension of the aluminoxane-loaded carrier with the transition metal compound, the transition metal compound may be used in an amount of from 0.0005 to 1 mole, preferably from 0.001 to 0.1 mole, and more preferably from 0.002 to 0.04 mole per 1 gram atom of aluminum of the solid aluminoxane in the suspension.

This contact treatment may generally be carried out with agitation at a temperature in the range of from $-50°$ C. to 200° C., preferably form $-20°$ C., and more preferably from $-10°$ C. to 50° C.

The solution of the transition metal compound is prepared at least from the transition metal compound and the solvent used to dissolve the transition metal compound as will be exemplified later. The solution of the transition metal may be obtained by simply mixing both compounds, or by mixing both compounds under heating. The solvent included in the solution of the transition metal compound may generally be from 1 to 500 liters, preferably from 2 to 200 liters, and more preferably from 3 to 100 liters per 1 mole of the transition metal compound.

(b) An olefin-polymerizing solid catalyst may be prepared by contacting a suspension of the fine-particle carrier dispersed into a solution of the aluminoxane and the group IVB transition metal with the solvent to which the aluminoxane is either insoluble or hardly soluble to produce a solid component.

Specifically, the olefin-polymerizing solid catalyst may be prepared by adding the solvent to which the aluminoxane is either insoluble or hardly soluble to the suspension comprising the aluminoxane, the transition metal compound, and the fine-particle carrier to precipitate the aluminoxane and the transition metal compound onto the carrier and form the fine-particle carrier loaded with the aluminoxane and the transition metal compound. The aluminoxane and the transition metal compound may also be precipitated by adding the suspension comprising the aluminoxane, the transition metal compound, and the fine-particle carrier to the solvent to which the aluminoxane is either insoluble or hardly soluble. The precipitation of the aluminoxane and/or the transition metal compound may also be promoted by evaporating off the solvent used for dissolving the aluminoxane from said mixed suspension.

In the step of contacting the suspension comprising the fine-particle carrier and the solution of the aluminoxane and the transition metal compound with the solvent to which the aluminoxane is either insoluble or hardly soluble, the solvent to which the aluminoxane is either insoluble or hardly soluble may generally be used in a proportion in the range of from 10 to 10,000 parts by weight, preferably from 100 to 1,000 parts by weight based on 100 parts by weight of the solution of the aluminoxane and the transition metal compound. The contact treatment is generally carried out with agitation at a temperature of from $-100°$ C. to 300° C., preferably from $-50°$ C. to 100° C., and more preferably from $-30°$ C. to 50° C.

The solution of the aluminoxane and the transition metal compound is prepared at least from the aluminoxane, the transition metal compound, and the solvent used for dissolving the aluminoxane as will be exemplified later. The solution may be obtained by simply mixing these compounds, or by mixing these compounds under heating. The solvent included in the solution may generally be from 0.1 to 50 liters, preferably from 0.2 to 10 liters, and more preferably from 0.3 to 2 liters per 1 gram atom aluminum in the aluminoxane.

In the solution, the aluminoxane and the transition metal compound may be included in a ratio of 0.0005 to 1, preferably 0.0001 to 0.1, and more preferably from 0.002 to 0.04 mole of the transition metal compound per 1 gram atom of aluminum in the aluminoxane.

In the suspension of the fine-particle carrier dispersed in the solution of the aluminoxane and the transition metal compound, the amount of the carrier is from 1 to 500 g, preferably from 10 to 200 g, and more preferably from 20 to 100 g per 1 liter of the solution.

The contact treatment may generally be carried out with agitation at a temperature of from $-100°$ C. to 300° C., preferably from $-50°$ to 100° C., and more preferably from $-30°$ to 50° C.

(c) An olefin-polymerizing solid catalyst may be prepared by contacting a suspension of the fine-particle carrier dispersed in the solvent to which the aluminoxane is either insoluble or hardly soluble with the aluminoxane solution to form a suspension of an aluminoxane-loaded fine-particle carrier; and contacting the aluminoxane-loaded carrier with the solution of the transition metal compound to form a solid component.

Specifically, the olefin-polymerizing solid catalyst may be prepared by adding the aluminoxane solution to the suspension of the fine-particle carrier dispersed into the solvent to which the aluminoxane is either insoluble or hardly soluble to precipitate the aluminoxane onto the fine-particle carrier and form an aluminoxane-loaded fine-particle carrier; and contacting the suspension comprising the aluminoxane-loaded carrier and the solvent to which the aluminoxane is either insoluble or hardly soluble with the solution of the transition metal compound to precipitate the catalyst-component transition metal compound onto the aluminoxane-loaded carrier. The aluminoxane may also be precipitated by adding the suspension comprising the fine-particle carrier and the solvent to which the aluminoxane is either insoluble or hardly soluble to the aluminoxane solution. The aluminoxane precipitation may also be promoted by evaporating off the solvent used for dissolving the aluminoxane from said mixed suspension.

In the suspension comprising the fine-particle carrier and the solvent to which the aluminoxane is either insoluble or hardly soluble, the amount of the carrier may generally be from 1 to 500 g, preferably from 10 to 200 g, and more preferably from 20 to 100 g per 1 liter of the solvent. The step of contacting the suspension with the aluminoxane solution may generally be carried out with agitation at a temperature of from $-100°$ C. to 300° C., preferably from $-50°$ C. to 100° C., and more preferably from $-30°$ C. to 50° C. In this step, the amount of the aluminoxane solution may generally be in the range of from 1 to 1,000 parts by weight, preferably from 10 to 100 parts by weight based on 100 parts by weight of the suspension.

The aluminoxane solution is prepared at least from the aluminoxane and the solvent capable of dissolving the aluminoxane as will be exemplified later. The aluminoxane solution may be obtained by simply mixing both compounds, or by mixing both compounds under heating. The solvent included in the aluminoxane solution may generally be from 0.1 to 50 liters, preferably from 0.2 to 10 liters, and more preferably from 0.3 to 2 liters per 1 gram atom of aluminum in the aluminoxane.

In the step of contacting the aluminoxane-loaded fine-particle carrier with the solution of the transition metal compound, the transition metal compound may be used in an amount of 0.0005 to 1 mole preferably from 0.001 to 0.1 mole and more preferably from 0.002 to 0.04 mole per 1 gram atom of aluminum in the aluminum-loaded carrier.

This step may generally carried out with agitation at a temperature of from $-50°$ C. to $200°$ C., preferably from $-20°$ C. to $100°$ C., and more preferably from $-10°$ C. to $50°$ C.

The solution of the transition metal compound is prepared at least from the transition metal compound and the solvent used for dissolving the transition metal compound as will be exemplified later. The transition metal compound solution may be obtained by simply mixing both compounds, or by mixing both compounds under heating. The solvent included in the solution of the transition metal compound may generally be from 1 to 500 liters, preferably from 2 to 200 liters, and more preferably from 3 to 100 liters per 1 mole of the transition metal compound.

(d) An olefin-polymerizing solid catalyst may be prepared by contacting a suspension of the fine-particle carrier dispersed in the solvent to which the aluminoxane is either insoluble or hardly soluble with the solution of the aluminoxane and the group IVB transition metal compound to precipitate the aluminoxane and the transition metal compound onto the fine-particle carrier and form a solid component.

Specifically, the olefin-polymerizing solid catalyst may be prepared by adding the solution of the aluminoxane and the transition metal to the suspension of the fine-particle carrier dispersed in the solvent to which the aluminoxane is either insoluble or hardly soluble to precipitate the aluminoxane and the group VIB transition metal compound onto the fine-particle carrier and produce a fine-particle carrier loaded with the aluminoxane and the transition metal catalyst. The aluminoxane and the transition metal compound may also be precipitated by adding the suspension comprising the fine-particle carrier and the solvent to which the aluminoxane is either insoluble or hardly soluble to the solution of the aluminoxane and the group IVB transition metal compound. The precipitation of the aluminoxane and/or the transition metal compound may also be promoted by evaporating off the solvent used for dissolving the aluminoxane and the transition metal compound from said mixed suspension.

In the suspension comprising the fine-particle carrier and the solvent to which the aluminoxane is either insoluble or hardly soluble, the amount of the carrier may generally be from 1 to 500 g, preferably from 10 to 200 g, and more preferably from 20 to 100 g per 1 liter of the solvent. The step of contacting the suspension with the solution of the aluminoxane and the transition metal compound may generally be carried out with agitation at a temperature of from $-100°$ C. to $300°$ C., preferably from $-50°$ C. to $100°$ C., and more preferably from $-50°$ C. to $100°$ C., and more preferably from $-30°$ C. to $50°$ C. In this step, the amount of the solution of the aluminoxane and the transition metal compound may generally be in the range of from 1 to 1,000 parts by weight, and preferably from 10 to 100 parts by weight based on 100 parts by weight of the suspension.

The solution of the aluminoxane and the transition metal compound is prepared at least from the aluminoxane, the transition metal compound and the solvent used for dissolving the aluminoxane as will be exemplified later. The solution may be obtained by simply mixing these compounds, or by mixing these compounds under heating. The solvent included in the solution may generally be from 0.1 to 50 liters, preferably from 0.2 to 10 liters, and more preferably from 0.3 to 2 liters per 1 gram atom of aluminum in the aluminoxane.

The amount of the transition metal compound in the solution may generally be from 0.0005 to 1 mole, preferably from 0.001 to 0.1 mole, and more preferably from 0.002 to 0.04 gram atom per 1 mole of the aluminum atom.

The solvents which are capable of dissolving the group IVB transition metal compound include, aromatic hydrocarbons such as benzene, toluene, ethylbenzene, propylbenzene, butylbenzene, and xylene, and halogen-containing hydrocarbons such as chlorobenzene and dichloroethane.

The solvents to which the group IVB transition metal compound is either insoluble or hardly soluble include aliphatic hydrocarbons such as pentane, hexane, decane, dodecane, and kerosin, and alicyclic hydrocarbons such as cyclohexane.

The solvents which are capable of dissolving the aluminoxane include, aromatic hydrocarbons such as benzene, toluene, ethylbenzene, propylbenzene, butylbenzene, and xylene.

The solvents to which the aluminoxane is either insoluble or hardly soluble include linear and branched aliphatic hydrocarbons such as pentane, hexane, decane, dodecane, and kerosin, and alicyclic hydrocarbons such as cyclohexane, norbornane, and ethylcyclohexane.

The solvent to which the aluminoxane is either insoluble or hardly soluble may preferably have a higher boiling point than the solvent used for dissolving the aluminoxane.

The solid catalyst component (A') prepared by the processes as set forth above may contain the transition metal compound in an amount of from 0.5 to 500 mg atoms, preferably from 1 to 200 mg atoms, and more preferably from 3 to 50 mg atoms calculated as transition metal atom per 100 g of the fine-particle carrier. The catalyst-component (B) may contain the aluminoxane in an amount of from 5 to 50,000 mg atoms, preferably from 50 to 10,000 mg atoms, and more preferably from 100 to 4,000 mg atoms calculated as aluminum atom per 100 g of the organic fine-particle carrier. In the solid catalyst component (A'), the atomic ratio (Al/M) of the transition metal to aluminum may be from 1 to 1,000, preferably from 6 to 600, and more preferably from 15 to 300, and the average particle diameter may be from 5 to 200 $\mu$m, preferably from 10 to 150 $\mu$m, and more preferably from 20 to 100 $\mu$m.

The polymerization process of the present invention is effective for preparing an olefin polymer, particularly, ethylene polymer and an ethylene-α-olefin copolymer. Examples of the olefins which can be polymerized by the catalyst of the present invention include α-olefins having 2 to 20 carbon atoms, such as ethylene, propylene, 1-butene, 1-hexene, 4-methyl-1-pentene, 1-octene, 1-decene, 1-dodecene, 1-tetradecene, 1-hexadecene, 1-octadecene, 1-eicocene, etc. Among these, the present invention is suitable for polymerizing ethylene, or copolymerizing ethylene with an α-olefin having 3 to 10 carbon atoms.

In an olefin polymerization according to the present invention, olefins are polymerized by a gas-phase polymerization or a liquid-phase polymerization such as polymerization. In the slurry polymerization, either an inert hydrocarbon or the olefin itself may be used as a solvent.

Illustrative hydrocarbon media are aliphatic hydrocarbons such as butane, isobutane, pentane, hexane, octane, decane, dodecane, hexadecane, octadecane, etc.; alicyclic hydrocarbons such as cyclopentane, methylcyclopentane, cyclohexane, cyclooctane, etc.; and petroleum cuts such as kerosine, gas oil, etc.

The amount of the transition metal compound used in the liquid-phase polymerization including the slurry polymerization or the gas-phase polymerization according to the present method may generally be in the range of $10^{-8}$ to $10^{-2}$ gram atoms/liter, and preferably $10^{-7}$ to $10^{-3}$ gram atoms/liter as a concentration of the transition metal atom in the polymerization system.

The amount of the aluminoxane used in the liquid-phase or gas-phase polymerization according to the present invention may generally be up to 6 mg atoms/liter, preferably up to 3 mg atoms/liter, more preferably from 0.01 to 2 mg atoms/liter, and most preferably from 0.02 to 1 mg atom/liter. The ratio of aluminum atoms contained in the aluminoxane component (B) to the sum of the aluminum atoms contained in the aluminoxane component (B) and the organoaluminum compound component (C) may generally be from 20 to 95%, and preferably from 40 to 92%. The ratio of aluminum atoms contained in the organoaluminum compound component (C) to the sum of the aluminum atoms contained in the aluminoxane component (B) and the organoaluminum compound component (C) may generally be from 5 to 80%, and preferably from 8 to 60%. In the process according to the present invention, the ratio of the sum of the aluminum atoms contained in the aluminoxane component (B) and the organoaluminum compound component (C) to the transition metal atoms in the reaction system may generally be from 20 to 10,000, preferably from 40 to 5,000, and more preferably from 60 to 2,000.

When the process of the present invention is carried out by a liquid-phase polymerization such as slurry polymerization, the polymerization temperature may generally be in the range of from −50° C. to 120° C., and preferably from 0° C. to 100° C.

When the process of the present invention is carried out by a gas-phase polymerization, the polymerization temperature may generally be in the range of from 0° C. to 120° C., and preferably from 20° C. to 100° C.

The olefin polymerization may generally be carried out under a pressure of standard pressure to 100 kg/cm², and preferably from 2 to 50 kg/cm² by a batch method, semicontinuous method, or continuous method.

Further, the polymerization may be carried out in two or more steps corresponding to different reaction conditions.

When the slurry polymerization or the gas-phase polymerization is employed herein, a preliminary polymerization of the olefin may preferably be carried out prior to the olefin polymerization in the presence of above-mentioned catalyst. In the preliminary polymerization, from 1 to 1,000 g, preferably 5 to 500 g, and more preferably from 10 to 200 g of the olefin is polymerized per 1 gram atom of the transition metal component, namely the catalyst component (A). Examples of the olefins used for the preliminary polymerization besides ethylene include α-olefins having 3 to 20 carbon atoms such as propylene, 1-butene, 4-methyl-1-pentene, 1-hexene, 1-octene, 1-decene, 1-dodecene, 1-tetradecene. Ethylene is preferred.

The preliminary polymerization may be carried out at a temperature of from −20° C. to 70° C., preferably from −10° C. to 60° C., and more preferably from 0° C. to 50° C.

The preliminary polymerization may be carried out either by a batch method or by a continuous method, and either under an atmospheric pressure or under an elevated pressure.

The preliminary polymerization may be carried out in the presence of a molecular weight modifier such as hydrogen. The molecular weight modifier may preferably be used in an amount sufficient to prepare a preliminarily polymerized product having an intrinsic viscosity η of at least 0.2 dl/g, and preferably from 0.5 to 20 dl/g.

The preliminary polymerization may be carried out without using any solvent or in an inert hydrocarbon medium, and preferably in an inert hydrocarbon medium. The inert hydrocarbon medium used in the preliminary polymerization may be selected from the above-described solvents to which the aluminoxane is either insoluble or hardly soluble.

In the preliminary polymerization, the catalyst concentration within the reaction system may generally be in the range of from $10^{-6}$ to 1 gram atom/liter, and preferably from $10^{-4}$ to $10^{-2}$ gram atom/liter.

EXAMPLE

The present invention is hereinafter illustratively described by referring to the examples.

Preparation of Methylaluminoxane

A 400 ml flask equipped with an agitator was fully purged with nitrogen and charged with 37 g of Al$_2$(SO$_4$)$_3$.14H$_2$O and 125 ml of toluene, and cooled to 0° C. To this solution, 125 ml toluene solution containing 50 ml trimethylaluminum was added dropwise in 1 hour. The solution was then gradually heated to 40° C. in 2 hours, and reacted at this temperature for 40 hours. After the reaction, solid was removed by filtration, and low-boiling contents were removed from the filtrate by means of an evaporator. Toluene was added to the remaining viscous solution to obtain the methylaluminoxane as a toluene solution.

The molecular weight determined by cryoscopy in benzene was 888. Accordingly, the degree of polymerization of this aluminoxane was 15.

EXAMPLE 1

A 1 liter glass reactor fully purged with nitrogen was charged with 350 ml of toluene and 150 ml of 4-methyl-1-pentene. To the reaction system, 0.38 mmol of diisobutylaluminum methoxide, 0.75 mmol calculated as Al atom of the methylaluminoxane in toluene, and 0.0025 mmol calculated as Zr atom of biscyclopentadienylzirconium dichloride in toluene was respectively added while ethylene was introduced at a rate of 155 Nl/hr. The reaction solution was adjusted to a temperature of 20° C. by means of an ice water. When 5 minutes had passed after the addition of biscyclopentadienylzirconium dichloride, about 5 ml of methanol was added to stop the polymerization. The resulting polymer was thoroughly dried, and the yield was measured to be 14.8 g.

EXAMPLES 2–4

The procedure of Example 1 was repeated except that 0.38 mmol diisobutylaluminum methoxide employed in Example 1 was replaced by the compounds shown in Table 1. The results are also shown in Table 1.

COMPARATIVE EXAMPLE 1

The procedure of Example 1 was repeated except that the use of diisobutylaluminum methoxide was omitted. The results are shown in Table 1.

TABLE 1

| Example | Organoaluminum compound, mM | | Methyl- aluminoxane, mM* | Polymerization activity, gPE/mMZr | MFI, dg/min | Density, g/min |
|---|---|---|---|---|---|---|
| 1 | (isoBu)$_2$AlOMe | 0.38 | 0.75 | 5900 | 1.7 | 0.881 |
| 2 | (isoBu)$_2$AlOMe | 0.075 | 0.75 | 4200 | 1.8 | 0.883 |
| 3 | (isoBu)$_2$AlOSiMe$_3$ | 0.38 | 0.75 | 5200 | 2.2 | 0.877 |
| 4 | (isoBu)$_2$Al(SiEt)$_3$ | 0.38 | 0.75 | 5700 | 1.8 | 0.882 |
| 1** | — | 0 | 0.75 | 1660 | 3.6 | 0.886 |

*calculated as aluminum atom
**comparative example

EXAMPLE 5

Preparation of Solid Catalyst

To a 300 ml pressure-reducible reactor equipped with an agitator, 67 ml of toluene solution containing 100 mmol calculated as aluminum atom of said methylaluminoxane was added, and 100 ml of purified n-decane was then gradually added for about 0.5 hour at room temperature with agitation to precipitate the methylaluminoxane. The reactor was evacuated to a pressure of 4 torr by means of a vacuum pump while the temperature of the reactor was gradually elevated to 35° C. in about 3 hours to remove toluene within the reactor and further precipitate the methylaluminoxane. The reaction solution was filtered to remove the liquid-phase portion. The thus obtained solid portion was further suspended in n-decane, to which 5 ml toluene solution containing 0.2 mmol biscyclopentadienylzirconium dichloride was added. After stirring at room temperature for about 1 hour, the reaction solution was subjected to a filtration to remove liquid-phase portion and obtain an olefin-polymerizing solid catalyst.

The thus obtained solid catalyst had a Zr content of 0.6% by weight, Al content of 47% by weight, and average catalyst-particle diameter measured by microscope observation of about 30 μm.

Preliminary Polymerization

To a 400 ml reactor equipped with an agitator, 100 ml of purified n-decane, 50 mmol of diisobutylaluminum methoxide, and 0.1 mmol calculated as Zr of said solid catalyst was added under nitrogen atmosphere. Ethylene was introduced into the reaction system at a rate of 4 Nl/hr for 1 hour, while the temperature was kept at 20° C. After completing the ethylene introduction, the reaction system was purged with nitrogen, washed once with purified hexane, and further suspended in hexane and stored in a catalyst bottle.

Polymerization

An autoclave having an internal volume of 2 liters was fully purged with nitrogen and charged with a dispersant of 250 g sodium chloride. The autoclave was evacuated with a vacuum pump to an internal pressure of 50 mmHg or less at an elevated temperature of 90° C. for 2 hours. The autoclave was cooled to a temperature of 75° C., purged with ethylene, and charged with 0.005 mmol calculated as zirconium atom of the preliminarily treated solid catalyst component. The autoclave was sealed and then charged with 50 Nml of hydrogen, and the internal pressure was then elevated to 8 kg/cm$^2$G with ethylene. The agitation speed was increased to 300 rpm and the polymerization was carried out at 80° C. for 1 hour.

After completing the polymerization, the polymer and the sodium chloride within the autoclave were all taken out and introduced into about 1 liter of water. After 5 minutes of agitation, substantially all of the sodium chloride dissolved in water, and only the polymer was floating on the water. The floating polymer was recovered, thoroughly washed with methanol, and dried overnight at 80° C. under reduced pressure. The results are shown in Table 2.

COMPARATIVE EXAMPLE 2

The procedure of Example 5 was repeated except that diisobutylaluminum methoxide was not employed. The results are shown in Table 2.

EXAMPLE 6

The procedure of Example 5 was repeated except that diisobutylaluminum methoxide was replaced by isoBu$_2$AlOSiEt$_2$. The results are shown in Table 2.

TABLE 2

| Example | Polymerization activity, gPE/mMZr | MFI, dg/min | Apparent bulk density, g/ml |
|---|---|---|---|
| 5 | 21,700 | 1.1 | 0.45 |
| 6 | 18,900 | 2.1 | 0.45 |
| 2* | 13,300 | 6.2 | 0.45 |

*comparative example

EXAMPLE 7

Preparation of Solid Catalyst Loaded on a Carrier

To a 300 ml pressure-reducable reactor equipped with an agitator, 67 ml of toluene solution containing 100 mmol calculated as aluminum atom of said methylaluminoxane and 4 g of powder polyethylene having an average particle diameter of 35 μm (trade name Mipelon ®, manufactured by Mitsui Petrochemical Industries Ltd.) were added. Reaction system was kept at room temperature and 100 ml of purified n-decane was gradually added in about 0.5 hour with agitation to precipitate the methylaluminoxane. The reactor was then evacuated to a pressure of 4 torr by means of a vacuum pump while the temperature of the reactor was gradually elevated to 45° C. in about 3 hours to remove toluene within the reactor and further precipitate the methylaluminoxane. The reaction solution was filtered to remove the liquid-phase portion. The thus obtained solid portion was further suspended in n-decane, to which 5 ml toluene solution containing 0.24 mmol biscyclopentadienylzirconium dichloride was added. After stirring at room temperature for about 1 hour, the reactor was evacuated to about 4 torr for 30 minutes at room temperature to remove toluene. To the suspension, 10 mmol of diisobutylaluminum methoxide was added and stirred for 60 minutes at room temperature. The reaction solution was cooled to −20° C., and filtered to obtain an olefin-polymerizing solid catalyst.

The thus obtained solid catalyst had a Zr content per 100 g carrier polyethylene of 10 mmol, Al content per 100 g carrier polyethylene of 2.2 mol, and average catalyst-particle diameter measured by microscope observation of about 40 μm.

Preliminary Polymerization

To a 400 ml reactor equipped with an agitator, 100 ml of purified n-decane and 0.1 mmol calculated as Zr of said solid catalyst was added under nitrogen atmosphere. Ethylene was introduced into the reaction system at a rate of 4 Nl/hr for 1 hour, while the temperature was kept at 20° C. After completing the ethylene introduction, the reaction system was purged with nitrogen, washed once with purified hexane, and further suspended in hexane and stored in a catalyst bottle.

Polymerization

An autoclave having an internal volume of 2 liters was fully purged with nitrogen and charged with a dispersant of 250 g sodium chloride. The autoclave was evacuated with a vacuum pump to an internal pressure of 50 mmHg or less at an elevated temperature of 90° C. for 2 hours. The autoclave was cooled to a temperature of 75° C., purged with ethylene, and charged with 0.005 mmol calculated as zirconium atom of the preliminarily treated solid catalyst component. The autoclave was sealed and then charged with 50 Nml of hydrogen, and the internal pressure was then elevated to 8 kg/cm²G with ethylene. The agitation speed was increased to 300 rpm and the polymerization was carried out at 80° C. for 1 hour.

After completing the polymerization, the polymer and the sodium chloride within the autoclave were all taken out and introduced into about 1 liter of water. After 5 minutes of agitation, substantially all of the sodium chloride dissolved in water, and only the polymer was floating on the water. The floating polymer was recovered, thoroughly washed with methanol, and dried overnight at 80° C. under reduced pressure. The resulting polymer had an yield of 103 g, MFR of 1.4 dg/min, and apparent bulk density of 0.45 g/ml.

COMPARATIVE EXAMPLE 3

The procedure of Example 7 was repeated except that diisobutylaluminum methoxide was not employed. The results are shown in Table 3.

EXAMPLE 8

Preparation of Solid Catalyst Loaded on a Carrier

To a 300 ml pressure reducible reactor equipped with an agitator, 67 ml of toluene solution containing 100 mmol calculated as Al atom of said methylaluminoxane and 4 g of powder polyethylene having an average particle diameter of 35 μm (trade name Mipelon ®, manufactured by Mitsui Petrochemical Industries Ltd.) were added. Reaction system was kept at room temperature and 100 ml of purified n-decane was gradually added in about 0.5 hour with agitation to precipitate the methylaluminoxane. The reactor was then evacuated to a pressure of 4 torr by means of a vacuum pump while the temperature of the reactor was gradually elevated to 45° C. in about 3 hours to remove toluene within the reactor and further precipitate the methylaluminoxane. The reaction solution was filtered to remove the liquid-phase portion. The thus obtained solid portion was further suspended in n-decane, to which 5 ml toluene solution containing 0.24 mmol biscyclopentadienylzirconium dichloride was added. After stirring at room temperature for about 1 hour, the reactor was evacuated to about 4 torr for 30 minutes at room temperature to remove toluene. The suspension was filtered to obtain an olefin-polymerizing solid catalyst.

The thus obtained solid catalyst had a Zr content per 100 g carrier polyethylene of 10 mmol, Al content per 100 g carrier polyethylene of 1.9 mol, and average catalyst-particle diameter measured by microscope observation of about 40 μm.

Preliminary Polymerization

To a 400 ml reactor equipped with an agitator, 100 ml of purified n-decane, 50 mmol of diisobutylaluminum methoxide, and 0.1 mmol calculated as Zr of said solid catalyst was added under nitrogen atmosphere. Ethylene was introduced into the reaction system at a rate of 4 Nl/hr for 1 hour, while the temperature was kept at 20° C. After completing the ethylene introduction, the reaction system was purged with nitrogen, washed once with purified hexane, and further suspended in hexane and stored in a catalyst bottle.

Polymerization

Ethylene was polymerized in a similar manner as Example 7.

COMPARATIVE EXAMPLE 4

The procedure of Example 8 was repeated except that diisobutylaluminum methoxide was not employed. The results are shown in Table 3.

EXAMPLE 9

Preparation of Solid Catalyst Loaded on a Carrier

To a 300 ml pressure reducible reactor equipped with an agitator, 67 ml of toluene solution containing 100 mmol calculated as Al atom of said methylaluminoxane and 2 g of silica which had been calcined at 500° C. for 12 hours (#952, prepared by Devison K. K.) were added. Reaction system was kept at room temperature and 100 ml of purified n-decane was gradually added in about 0.5 hour with agitation to precipitate the methylaluminoxane. The reactor was then evacuated to a pressure of 4 torr by means of a vacuum pump while the temperature of the reactor was gradually elevated to 35° C. in about 3 hours to remove toluene within the reactor and further precipitate the methylaluminoxane. The reaction solution was filtered to remove the liquid-phase portion. The thus obtained solid portion was further suspended in n-decane, to which 5 ml toluene solution containing 0.2 mmol biscyclopentadienylzirconium dichloride was added. After stirring at room temperature for about 1 hour, liquid-phase portion was removed to obtain an olefin-polymerizing solid catalyst.

The thus obtained solid catalyst had a Zr content per 100 g carrier polyethylene of 7 mmol, Al content per 100 g carrier polyethylene of 2.4 mol, and average catalyst-particle diameter measured by microscope observation of about 40 μm.

The preliminary polymerization and the solventless-polymerization of ethylene were carried out in a similar manner as Example 8. The results are shown in Table 3.

COMPARATIVE EXAMPLE 5

The procedure of Example 9 was repeated except that diisobutylaluminum methoxide was not employed. The results are shown in Table 3.

TABLE 3

| Example | Polymerization activity. gPE/mMZr | MFI. dg/min | Apparent bulk density. g/ml |
|---|---|---|---|
| 7 | 20.600 | 1.4 | 0.45 |
| 3* | 14.300 | 3.3 | 0.45 |
| 8 | 21.300 | 1.1 | 0.46 |
| 4* | 14.300 | 3.3 | 0.45 |
| 9 | 19.700 | 1.7 | 0.45 |
| 5* | 13.200 | 6.2 | 0.46 |

*comparative example

Preparation of Aluminoxane

A 400 ml flask was fully purged with nitrogen and charged with 37 g of $Al_2(SO_4)_3 \cdot 14H_2O$ and 125 ml of toluene, and cooled to 0° C. To this solution, 500 mmol trimethylaluminum diluted with 125 ml toluene solution was added dropwise. The solution was then heated to 40° C. and allowed to react for 10 hours at this temperature. After the reaction, solid was removed by filtration, and toluene was further removed from the filtrate to give 13 g of aluminoxane as a white solid.

The molecular weight determined by cryoscopy in benzene was 930. Accordingly, the value of m (degree of polymerization) in the catalyst component (B) was 14.

EXAMPLE 10

Preparation of Solid Catalyst Loaded on a Carrier

To a 200 ml flask fully purged with nitrogen, 52 g of silica having average particle diameter of 70 μm, specific surface area of 260 m²/g, and pore volume of 1.65 cm³/g which had been calcined for 5 hours, 26 ml of toluene solution of dimethylaluminum monochloride (Al, 1 mol/liter), and 50 ml of toluene were added and heated at 80° C. for 2 hours. Solid portion was separated by filtration to obtain catalyst component. The thus obtained catalyst component was transferred into 50 ml of toluene, and 43 ml toluene solution of biscyclopentadienylzirconium dichloride (Zr, 0.04 mol/liter) which is a catalyst component was added thereto. The reaction mixture was heated at 80° C. for 1 hour and subjected to a filtration. To the thus obtained solid portion, 19.6 ml toluene solution of aluminoxane (Al, 1.03 mol/liter) and 80 ml of toluene was added and the mixture was agitated for 30 minutes at room temperature. Toluene was removed at room temperature by means of an evaporator to give a solid catalyst having Zr content of 0.08% by weight and Al content of 10% by weight.

The preliminary polymerization and the solventless polymerization of ethylene was carried out in a similar manner as Example 8 except that the scale of the preliminary polymerization was reduced to one half of the Example 8.

COMPARATIVE EXAMPLE 6

The procedure of Example 10 was repeated except that diisobutylaluminum methoxide was not employed. The results are shown in Table 4.

EXAMPLE 11

Preparation of Solid Catalyst Loaded on a Carrier

A 400 ml pressure reducible reactor equipped with an agitator was fully purged with nitrogen. In this reactor, 50 ml toluene solution containing 2 mmol aluminoxane was added to a suspension comprising 5 g of silica (#952, manufactured by Devison K.K.) calcined at 800° C. for 12 hours and 100 ml of toluene at room temperature. The mixed solution was heated to 50° C. and allowed to react for 2 hours at this temperature. When the reaction had ceased, liquid portion was removed from the reaction solution by filtration. The solid residue was suspended in 100 ml toluene, and 9.4 ml toluene containing 0.38 mmol biscyclopentadienylzirconium dichloride was added to the suspension at 25° C. The reaction was allowed to continue at this temperature for 2 hours with agitation. When the reaction had ceased, liquid portion was removed from the suspension by filtration, and the solid residue was washed twice with toluene to give the solid catalyst component (A') which had zirconium loading weight of 0.6% by weight. To a 2 g portion of the thus obtained solid catalyst component (A'), 47 ml toluene solution of aluminoxane (Al, 1.03 mol/liter) and 50 ml toluene was added and agitation was continued at room temperature for 30 minutes. Toluene was then removed from the reaction system at room temperature by means of an evaporator to give the aluminoxane-loaded solid component.

The preliminary polymerization and the solventless polymerization then carried out in a manner similar to Example 8. The results are shown in Table 4.

COMPARATIVE EXAMPLE 7

The procedure of Example 11 was repeated except for that diisobutylaluminum methoxide was not used. The results are shown in Table 4.

EXAMPLE 12

Preparation of Solid Catalyst Component (A')

A 400 ml pressure reducible reactor equipped with an agitator was fully purged with nitrogen. In this reactor, a mixed suspension comprising 3 g of silica (#952, manufactured by Devison K.K.) which had been calcined at 800° C. for 12 hours and 50 ml of trichlorosilane were reacted at 50° C. for 2 hours with agitation. When the reaction had ceased, liquid portion was removed from the reaction solution by filtration. The solid residue was suspended in 50 ml toluene, and 300 ml toluene containing 15 mmol biscyclopentadienylzirconium dichloride was added to the suspension at 25° C. The reaction was allowed to continue at 50° C. for 2 hours with agitation. When the reaction had ceased, liquid portion was removed from the suspension by filtration, and the solid residue was washed twice with toluene to give the solid catalyst component (A') which had zirconium loading weight of 1.2% by weight. To a 1 g portion of the thus obtained solid catalyst component (A'), 47 ml toluene solution of aluminoxane (Al, 1.03 mol/liter) and 50 ml toluene were added and agitation was continued at room temperature for 30 minutes. Toluene was then removed from the reaction system at room temperature by means of an evaporator to give the aluminoxane-loaded solid component.

The preliminary polymerization and the solventless polymerization were then carried out in a manner similar to Example 8. The results are shown in Table 4.

COMPARATIVE EXAMPLE 8

The procedure of Example 12 was repeated except that diisobutylaluminum methoxide was not used. The results are shown in Table 4.

TABLE 4

| Example | Polymerization activity, gPE/mMZr | MFI, dg/min | Apparent bulk density, g/ml |
|---|---|---|---|
| 10 | 7,200 | 0.8 | 0.39 |
| 6* | 3,400 | 3.2 | 0.38 |
| 11 | 7,100 | 1.7 | 0.42 |
| 7* | 4,100 | 6.3 | 0.42 |
| 12 | 5,100 | 1.8 | 0.41 |
| 8* | 2,200 | 3.6 | 0.41 |

*comparative example

EXAMPLE 13

The procedure of Example 8 was repeated to prepare a solid catalyst loaded on a carrier except that the amount of the methylaluminoxane used was changed from 100 mmol to 30 mmol, and the amount of the diisobutylaluminum methoxide added during the preliminary polymerization was changed from 50 mmol to 15 mmol. The preliminary polymerization and the solventless polymerization of ethylene were also carried out in a similar manner as Example 8. The results are shown in Table 5.

COMPARATIVE EXAMPLE 9

The procedure of Example 13 was repeated except that diisobutylaluminum methoxide was not used. The results are shown in Table 5.

EXAMPLE 14

The procedure of Example 13 was repeated except that diisobutylaluminum methoxide was replaced with (isoBu)$_2$Al—O—SiEt$_3$.
The results are shown in Table 5.

COMPARATIVE EXAMPLE 10

The procedure of Example 14 was repeated except that (isoBu)$_2$Al—O—SiEt$_3$ was not used. The results are shown in Table 5.

TABLE 5

| Example | Polymerization activity, gPE/mMZr | MFI, dg/min | Apparent bulk density, g/ml |
|---|---|---|---|
| 13 | 7,100 | 1.4 | 0.45 |
| 9* | 2,700 | 6.7 | 0.45 |
| 14 | 6,800 | 1.1 | 0.45 |
| 10* | 2,700 | 6.7 | 0.45 |

*comparative example

INDUSTRIAL APPLICABILITY

The first embodiment of the present invention is directed to a novel catalyst and a process for polymerizing an olefin by using such a catalyst, which enables production of a homopolymer having a narrow molecular-weight distribution as well as a copolymer having a narrow composition distribution at a high polymerization activity, even when the amount of aluminoxane included in the catalyst is significantly reduced, by making use of synergistic effects of aluminoxane and organoaluminum compound.

By utilizing the catalyst and the process for polymerizing the olefin by using such a catalyst according to the second embodiment of the present invention, production of a polymer and copolymer has been enabled which has a high bulk density and uniform particle size with little powdery product as well as the above-described advantages.

We claim:

1. A catalyst useful for the polymerization of an olefin prepared from
   (A) a compound selected from the group consisting of zirconium and hafnium compounds having a ligand including conjugated $\pi$ electron,
   (B) an aluminoxane, and
   (C) an organoaluminum compound represented by the general formula (I) or (II):

$$R^1{}_m Al(OR^2)_{3-m} \qquad (I)$$

$$R^3{}_n Al(OSiR^4{}_3)_{3-n} \qquad (II)$$

wherein $R^1$, $R^2$ and $R^3$, independently of each other, are hydrocarbon radicals, $R^4$ is selected from the group consisting of hydrocarbon, alkoxy and aryloxy radicals, and m and n are positive numbers of $0<m<3$ and $0<n<3$.

2. The catalyst of claim 1 wherein said compound (A) is a compound represented by the general formula (III):

$$R^{1'}{}_k . R^{2'}{}_l . R^{3'}{}_m . R^{4'}{}_n . Zr \qquad (III)$$

wherein $R^{1'}$ is unsubstituted or substituted cycloalkadienyl radical; $R^{2'}$, $R^{3'}$ and $R^{4'}$ are independently selected from the group consisting of cycloalkadienyl, aryl, alkyl, cycloalkyl aralkyl radicals, halogen atom, hydrogen, $OR^a$, $SR^b$, $NR^c{}_2$ and $PR^d{}_2$, wherein $R^a$, $R^b$, $R^c$ and $R^d$ are hydrocarbon radicals independently selected from the group consisting of alkyl, cycloalkyl, aryl and aralkyl radicals and silyl radical, with the proviso that $R^c$ and $R^d$ may, taken together, form a ring; $k' \geq 1$; and $k' + l' + m' + n' = 4$; and $R^{1'}$ and $R^{2'}$ may be bonded by an intervening lower alkylene radical when $R^{2'}$ is a cycloalkadienyl radical.

3. The catalyst of claim 1 wherein, in formula (I) or (II), $R^1$, $R^2$ and $R^3$ are independently selected from the group consisting of linear or branched, saturated or unsaturated, aliphatic hydrocarbon radical having 1 to 10 carbon atoms, alicyclic hydrocarbon radical having 4 to 10 carbon atoms; and aromatic hydrocarbon radical having 6 to 16 carbon atoms.

4. The catalyst of claim 3 wherein, in formula (I), $R^1$ is branched alkyl radical.

5. The catalyst of claim 3 wherein, in formula (II), $R^3$ is branched alkyl radical.

6. The catalyst of claim 3 wherein, in formula (I), $R^2$ is methyl radical.

7. The catalyst of claim 1 wherein, in formula (II), $R^4$ is selected from the group consisting of aliphatic hydrocarbon radical having 1 to 10 carbon atoms, alicyclic hydrocarbon radical having 4 to 10 carbon atoms, aromatic hydrocarbon radical having 6 to 16 carbon atoms, alkoxy radical having 4 to 10 carbon atoms, and aryloxy radical.

8. The catalyst of claim 1 wherein the organoaluminum compound (C) is a compound represented by the formula (I).

9. The catalyst of claim 1 wherein the organoaluminum compound (C) is a compound represented by the formula (II).

* * * * *